United States Patent [19]

Moriguchi

[11] Patent Number: 4,490,746
[45] Date of Patent: Dec. 25, 1984

[54] IMAGE INPUT/OUTPUT DEVICE

[75] Inventor: Haruhiko Moriguchi, Kanagawa, Japan

[73] Assignee: Fuji Xerox Co., Ltd., Tokyo, Japan

[21] Appl. No.: 407,851

[22] Filed: Aug. 13, 1982

[30] Foreign Application Priority Data

Aug. 14, 1981 [JP] Japan .................................. 56-126832

[51] Int. Cl.³ .............................................. H04N 1/32
[52] U.S. Cl. ..................................... 358/286; 358/257
[58] Field of Search ........................ 358/256, 257, 286

[56] References Cited

U.S. PATENT DOCUMENTS 4,384,307 5/1983 Kuzmik ................................ 358/257

Primary Examiner—Howard W. Britton
Attorney, Agent, or Firm—Sughrue, Mion, Zinn, Macpeak and Seas

[57] ABSTRACT

An image input/output device having a device body with an operating panel and a controlling computer section comprising a central processing unit, a read-only memory a random access memory and a bus line for transmitting data therebetween. An input/output control section connects the controlling computer section and the device body to each other. A start/stop switch is provided on said operating panel. The computer determines (1) whether or not the device body is in operation, (2) whether or not said device body is connected through a line to an outside device, and (3) whether or not an original is set at a predetermined position. When the start/stop switch is operated, according to outputs of the computer, the device is stopped, or a specific mode copying, signal receiving or a signal transmitting is selected, so that the device is automatically operated in the mode thus selected.

5 Claims, 4 Drawing Figures

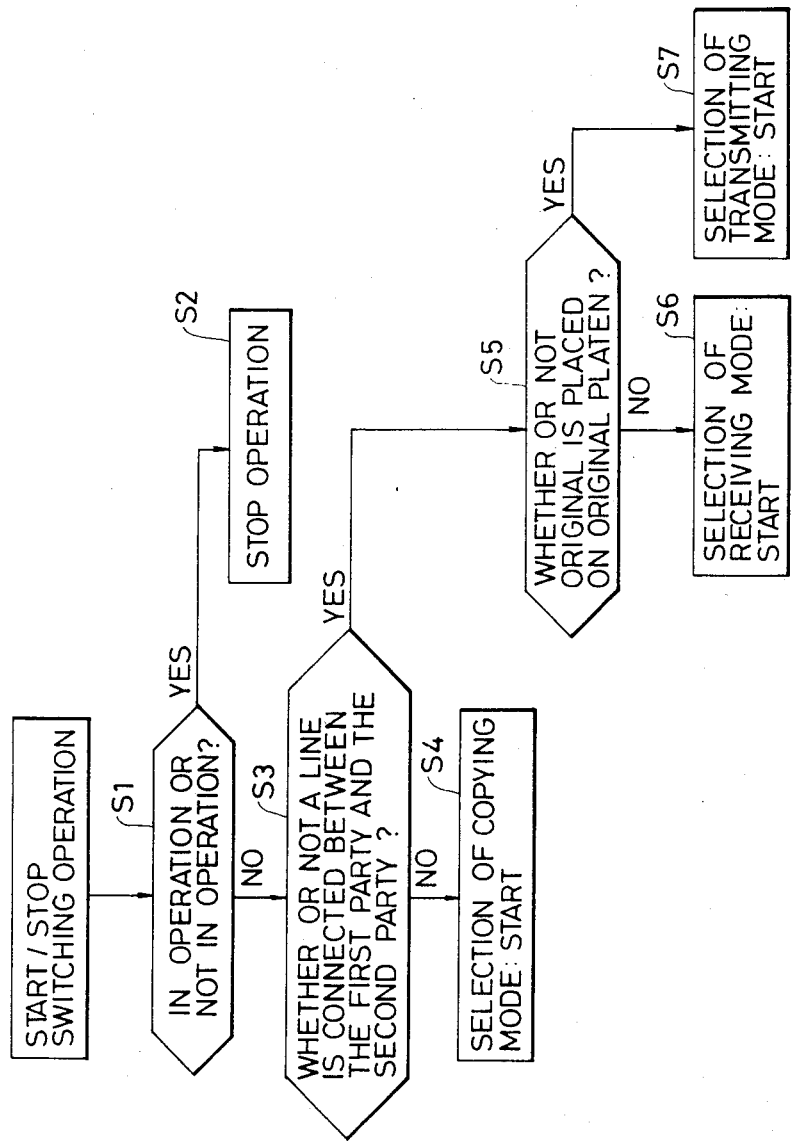

IMAGE INPUT/OUTPUT DEVICE

BACKGROUND OF THE INVENTION

This invention relates to an image input/output device operating in a multi-mode device. In the case of a facsimile device an original is read so that it is transmitted as a video signal or, a video signal is received so that the record is obtained, and/or the original is copied.

More particularly, the invention relates to an image input/output device in a facsimile or the like in which various modes of operation, i.e., signal transmitting, a signal receiving, and copying can be automatically selected.

FIG. 1 shows one example of the operating panel of a conventional facsimile device or the like utilizing a telephone line. In FIG. 1, reference numerals 1 through 7 designate push button switches which function as follows:

1. Telephone reservation push button switch—
    Before or after a facsimile image is transmitted or received, a telephone line is connected to the telephone set so that communication is established between the facsimile and the second party.
2. Manual signal receiving push button switch—
    When this switch is depressed, for reception of a signal, a first connection to the telephone line is achieved. Thereafter, when the facsimile is placed in the signal receiving mode by a manual operation, reception of a facsimile image is carried out. When this push button switch is not operated, the facsimile is set in the automatic signal receiving mode.
3. Pale original push button switch—
    This switch is operated when an original to be transmitted is of low density. That is, it is used to improve the S/N ratio of a transmitting signal or to make a suitable density of any copy.
4. Copying push button switch—
    The operation of this switch sets the facsimile in the copying mode, so that the facsimile operates as a copying machine.
5. Mode selecting push button switch—
    The switch is used to select a high picture quality transmission made, that is, a standard transmission mode and a high speed transmission mode. For instance, the transmission modes are selected in the order of "high picture quality", "standard" and "high speed". Respective display lamps 13, 14 and 15 are turned on when the switch is successively operated.
6. Signal transmitting push button switch—
    The facsimile is caused to start an image transmitting operation.
7. Stopping push button switch—
    The operator can stop the operation of the facsimile at a desired time instant even during a signal receiving or transmitting operation.

In FIG. 1, reference numeral 8 designates an (Alpha and digital) display unit. The display unit 8 is used to display a variety of operation parameters. Typical displays are the number of originals which have been transmitted during the facsimile operation, the number of originals which have been copied during the copying operation, or the existance of a problem trouble or the conditions of lines.

Further in FIG. 1, reference numerals 9 through 12 designate condition display lamps. These lamps indicate that "a signal is being received in priority", "supplying receiving sheets are needed", "the facsimile is in communication", and "problem occurance", respectively.

As is apparent from the above description, a variety of push button switches are arranged on the operating panel of the conventional facsimile. For signal reception and transmission, these push button switches must be selected correctly and also operated in a correct order.

Thus, the operation is intricate and sometimes signal reception or transmission is interrupted by erroneous operation. Accordingly, in practice, the operating panel is handled only by a skilled person.

SUMMARY OF THE INVENTION

In view of the foregoing problems in operating a conventional machine, an object of this invention is to provide an image input/output device which an operator can correctly operate without extensive training.

Another object of this invention is to orovide an input/output system for a facsimile machine that automatically operates the machine in the selected mode.

In order to achieve the foregoing objects, in accordance with the invention, detection signals representative of the conditions of various parts in an image input/output device are monitored, and according to the combinations of these detection signals, the device is caused to detect the operation mode in which the device is set, so that a desired operation is automatically determined and started.

BRIEF DESCRIPTION OF THE DRAWINGS

FIG. 4 is a flow chart describing the operation of the invention.

DESCRIPTION OF THE PREFERRED EMBODIMENT

Figure 2:
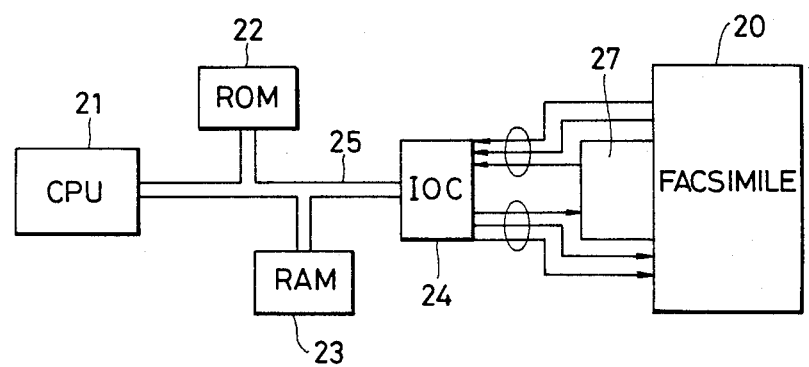
FIG. 2 is a block diagram outlining the arrangement of one embodiment of this invention.
Figure 3:
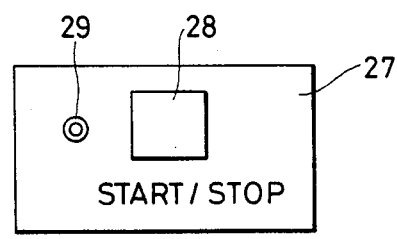
FIG. 3 is a plan view of an operating panel in this invention.

This invention will be described with reference to the accompanying drawings in detail. FIG. 2 is a block diagram illustrating the arrangement of an image input/output device according to the invention. FIG. 3 is a plan view of an operating panel. FIG. 4 is a flow chart providing a description of the operation of the image input/output device according to the invention.

In FIG. 2, reference numeral 20 designates a facsimile device body; 21, a controlling computer, namely, a central processing unit (hereinafter referred to as "a CPU", when applicable); 22, a read-only memory (hereinafter referred to as "a ROM", when applicable) for storing various controlling programs; and 23, a random access memory (hereinafter referred to as "a RAM", when applicable) for temporarily storing input data or output data. Each of these elements is well known in the technology.

In FIG. 2, reference numeral 24 designates an input/output control section (hereinafter referred to as "an IOC", when applicable) for transmitting various control and display signals from a controlling computer section comprising the CPU 21, the ROM 22 and the RAM 23 to the device body 20 and transmitting various detection signals from the device body 20 to the controlling computer section.

Further in FIG. 2, reference numeral 25 designates a bus line through which data are transmitted between the circuit elements in the controlling computer section and between the controlling computer section and the IOC 24. An operating panel 27 is provided on the device body 20. As shown in FIG. 3, a start/stop push button switch 28 and an operating display lamp 29 are provided on the operating panel 27.

The start/stop push button switch 28 operates as a start switch and also as a stop switch. In the operational case where the device body 20 is used as a facsimile transmitter or a copying machine, the operator is as follows: First, the operator places an original on a predetermined original platen, and then operates (pushes) the start/stop switch 28.

The depression signal of the switch 28 is applied through the IOC 24 and the bus line 25 to the CPU, so that the process outlined in the flow chart in FIG. 4 is carried out.

In Step S1, a determination is made whether or not the device 20 is in operation. This determination can be achieved by various conventional methods. For instance, the determination can be achieved by a pattern in a combination of various detection signals representative of whether or not an original is on an ADF (or an automatic document forwarding device) and whether or not a motor for an ADF, a motor for discharging an original or a motor for conveying a recording sheet is driven. Alternatively, the determination can be made from the address in the ROM 22 which is being read, i.e., the advancement of the program which now is executed by the CPU 21.

When it has been determined that the device body 20 is in operation in Step S1, the aforementioned depression of the start/stop switch is interpreted as a stopping operation. Therefore, the device body is stopped immediately, in Step S2.

When it has been determined that the device is not in operation, depression of the switch is interpreted as a starting operation. Then, the operation is advanced to Step S3, in which it is determined whether or not a line is connected between the device body (or the first party) and the second party. When the line is not connected, Step S4 is effected so that a copying mode is selected and copying operation is then started.

When it has been determined that the line is connected therebetween in Step S3, Step S5 is effected. In Step S5, a determination is made whether or not an original is placed on the original platen of the device.

When it has been determined that no original is placed on the platen, Step S6 is effected. In Step S6, the device body 20 is placed in a facsimile signal receiving mode, so that the signal receiving operation is started. When it has been determined that an original is placed on the platen, Step S7 is effectuated. In Step S7, the device body is placed in a facsimile signal transmitting mode, so that the signal transmitting operation is started.

As is apparent from the above description, according to the invention, merely by depressing the start/stop switch 28, the device body can be stopped, placed in a desired operation mode, or started separately according to the operating conditions or the preparatory conditions of the device body 20. Therefore, the device body can be operated even by an unskilled person without error.

The operation display lamp 29 on the operating panel 27 is turned on when the answer to the question in Step S1 is "Yes", i.e., when the device body 20 is in operation. Therefore, the display lamp 29 allows the operator to confirm that the device body starts a desired operation as a result of the depression of the switch, or serves to prevent the occurrence of problems where the operation of the device body is erroneously stopped.

Accordingly, instead of the operation display lamp 29, a plurality of operation display lamps may be provided for the various modes, i.e., copying, signal receiving and signal transmitting, respectively.

Selection of a communication mode during a socalled "initialization period" is automatically carried out by the device itself similarly as in case of a conventional device.

Figure 1:
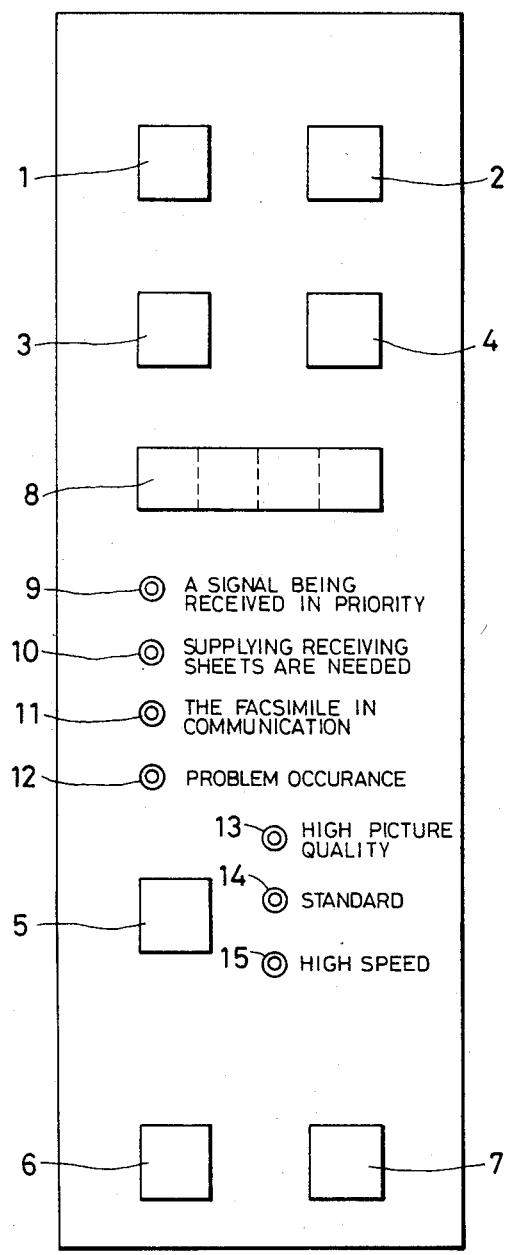
FIG. 1 is a plan view showing one example of the operating panel of a conventional facsimile using a telephone line.

As is apparent from the above description, in accordance with the invention, the copying mode, the facsimile signal receiving mode and the facsimile signal transmitting mode are automatically determined. Accordingly, push button switches or the like having other functions—such as those for telephone reservation, pale original and mode selection shown in FIG. 1—must be provided as required. In this case, it is desirable that these switches are provided at positions different from that of the operating panel 27, in order to prevent erroneous operation of the device.

The concept of the invention can be applied not only to a facsimile utilizing a telephone line but also to a facsimile using its own dedicated line. It is apparent that the invention can be applied to other automatic multimode equipment without departing from the essential scope thereof.

What is claimed is:

1. An input/output system comprising:
    a multi-mode device having an operation panel and a start/stop switch;
    a controlling computer having a central processing unit, a read-only memory, a random access memory and a bus line for transmitting data therebetween;
    means responsive to operation of said start/stop switch for determining whether or not said multi-mode device is in operation, whether said multi-mode device is connected to an external device and whether a data source is provided at a predetermined position in said multi-mode device, wherein in response to said determinations said multi-mode device is automatically operated in a predetermined mode.

2. An input/output system as in claim 1, wherein said data source is an original document and said modes of operation are facsimile transmission of original document to an external device or copying said original document by said multi-mode device, the mode determined by whether said multi-mode device is connected to said external device.

3. An input/output system as in claims 1 or 2, wherein said external device comprises a data input to said multi-mode device and said mode of operation comprises facsimile reception.

4. An input/output system as in claims 1 or 2, wherein said means for determining whether sad multi-mode device is in operation comprises sensor means to determine whether an original document comprising said data source is being utilized within said multi-mode device.

5. An input/output system as in claims 1 or 2, wherein said means for determining whether said multi-mode device is in operation comprises determining the address in said read only memory being read by said central processing unit to ascertain whether said multi-mode device is being operated by said controlling computer.

* * * * *